United States Patent [19]

Tropeano et al.

[11] Patent Number: 4,467,614
[45] Date of Patent: Aug. 28, 1984

[54] METHOD AND APPARATUS FOR REMOVING CONDENSATE AND OIL PARTICLES FROM A STREAM OF COMPRESSED AIR USED IN THE PRODUCTION OF SNOW

[76] Inventors: Joseph C. Tropeano; Joseph T. Tropeano; Thomas F. Tropeano, all of 12 Revere St., Lexington, Mass. 02173

[21] Appl. No.: 457,259

[22] Filed: Jan. 12, 1983

[51] Int. Cl.³ .......................... B01D 9/04; F28C 1/00
[52] U.S. Cl. ....................................... 62/124; 62/121; 55/82; 55/267; 55/222
[58] Field of Search ................... 62/121, 123, 124, 58, 62/317; 55/82, 267, 222; 159/45

[56] References Cited

FOREIGN PATENT DOCUMENTS

EP45101 2/1982 European Pat. Off. .............. 55/267
1302427 12/1961 France ................................. 55/267

Primary Examiner—Albert J. Makay
Assistant Examiner—Henry Bennett
Attorney, Agent, or Firm—Bachman and LaPointe

[57] ABSTRACT

A method and apparatus for removing oil particles and condensate from a stream of compressed air used in the production of snow by snow-making equipment wherein the condensate is first crystallized thus allowing the oil particles to adhere thereto and thereafter the crystallized condensate and oil particles are heated in a holding zone to form a liquid which is separated from the stream of compressed air and drained therefrom.

12 Claims, 3 Drawing Figures

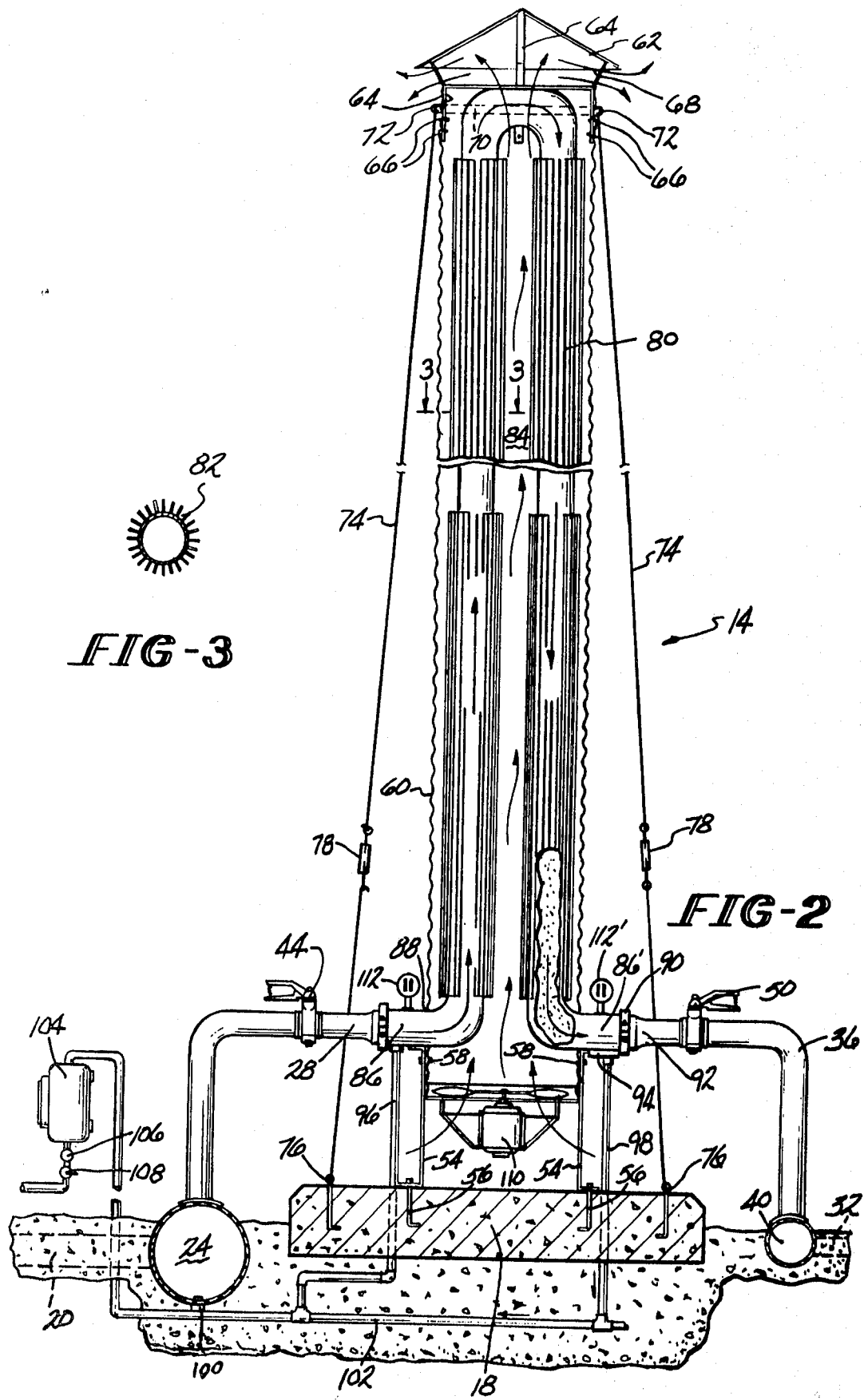

METHOD AND APPARATUS FOR REMOVING CONDENSATE AND OIL PARTICLES FROM A STREAM OF COMPRESSED AIR USED IN THE PRODUCTION OF SNOW

BACKGROUND OF THE INVENTION

The present invention is drawn to a method and apparatus for removing oil particles and water condensate from a line carrying a stream of compressed air to a snow-making apparatus.

In the snow-making art, it is well known to mix compressed air and pressurized water in a cold ambient atmosphere to produce a stream of snow particles. Typical snow-making apparatus are disclosed in U.S. Pat. Nos. 3,964,682 and 3,761,020, incorporated herein by reference, and comprise a plurality of snow-making nozzles which are fed compressed air and pressurized water through separate lines. The flow of compressed air and pressurized water to the nozzles of the snow-making apparatus are provided by conventional air compressors and water pump equipment. The compressors and pump equipment are generally located down the mountain far from the snow-making apparatus. The compressed air and pressurized water is fed to the snow-making apparatus via pipelines generally located beneath the surface of the earth. The pipelines connect to hoses which lead the compressed air and water respectively from the pipelines to the snow-making equipment nozzles. See for example U.S. Pat. No. 3,964,682.

Heretofore there has been a problem with line freeze up in the hose delivering the compressed air from the pipeline to the nozzles. In addition, a further problem has been encountered with freezing of the nozzles themselves. It has been found that the freeze up in the hose and nozzles occurs as a result of condensation which forms in the compressed air pipeline. The heat produced by the operation of the compressors results in a water condensate forming in the pipeline. The condensate freezes as it passes through the pipeline and hoses to the nozzles of the snow-making equipment due to the temperature of the ambient environment. Freezing of the hoses and nozzles requires that the snow-making equipment be shut down and thawed thereby resulting in lost snow production.

In addition to the foregoing, there has been a serious problem with oil in the compressed air pipeline. Oil is located in the compressor sump for the purpose of lubricating the moving parts of the compressor. During operation of the compressor a certain amount of the oil blows by the pistons of the compressors and is pumped with the compressed air into the compressed air pipeline. The oil particles are carried with the compressed air to the nozzles of the snow-making apparatus where it mixes with the snow and is spread on the ground. Later, when the snow melts, the oil is carried off with the water which results in oil contamination of the watersheds and streams.

Accordingly, it is a principal object of the present invention to provide a method and apparatus for effectively removing oil particles and condensation from a stream of compressed air being fed to a snow-making apparatus.

It is a particular object of the present invention to provide an apparatus for removing oil particles and condensation from a stream of compressed air which is inexpensive and efficient to operate.

Further objects and advantages of the present invention will appear hereinbelow.

SUMMARY OF THE INVENTION

In accordance with the present invention, the foregoing objects and advantages are readily obtained.

The present invention comprises a method and apparatus for removing oil particles and condensate from a stream of compressed air which is being fed from compressors to a snow-making apparatus. In accordance with the present invention a cooling tower is provided upstream of the compressors and downstream of the snow-making equipment. The cooling tower is provided with means for crystallizing the condensate. The oil particles in the air stream adhere to the crystallized condensate and are carried with the crystallized condensate by the flow of compressed air to a holding zone. The holding zone is heated so as to liquefy the crystallized condensate and the liquid and oil particles are separated from the stream of compressed air and are drained back to a holding tank.

By virtue of the method and apparatus of the present invention, water condensate which leads to freeze up of the snow-making equipment is effectively removed. In addition, oil in the compressed air line is removed thus eliminating a potentially serious water contamination problem.

BRIEF DESCRIPTION OF THE DRAWINGS

FIG. 2 is a partial sectional side view taken along line 2—2 of FIG. 1 illustrating a cooling tower in accordance with the present invention.

FIG. 3 is a sectional view of the cooling pipe used in the cooling tower of the present invention.

DETAILED DESCRIPTION

Figure 1:
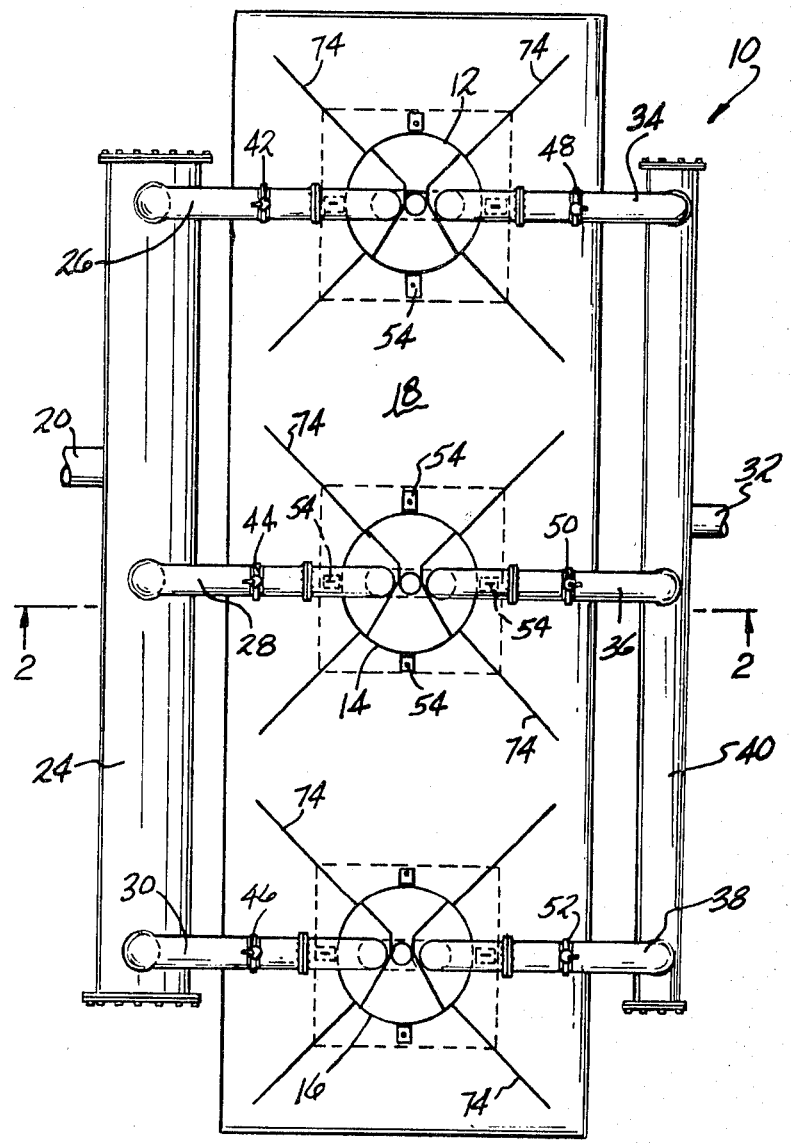
FIG. 1 is a top view of an installation used in accordance with the present invention for removing oil particles and condensation from a pipeline carrying a stream of compressed air to snow-making equipment.

With reference to the drawings, an installation 10 in accordance with the present invention is illustrated. As shown in FIG. 1, the installation 10 comprises a plurality of cooling towers 12, 14 and 16 mounted on a concrete foundation 18 in a manner to be described in detail hereinbelow. The cooling towers 12, 14 and 16 are in communication with pipeline 20 via an intake distributor tank 24 and intake pipes 26, 28 and 30, respectively. Pipeline 20 receives a stream of compressed air from a compressor station, not shown, located downstream of the installation 10. While the installation illustrated in FIG. 1 includes three cooling towers it should be appreciated that the number of cooling towers employed may be of any desired number. The cooling towers 12, 14 and 16 are connected on their downstream side with pipeline 32 which delivers the stream of compressed air to the snow-making apparatus via discharge pipes 34, 36 and 38, respectively, and discharge distributor 40. Each of the intake pipes 26, 28 and 30 are provided with valves 42, 44 and 46, respectively for selectively communicating compressed air from intake distributor tank 24 to any one or more of the cooling towers 12, 14 and 16. Valves 48, 50 and 52 are provided in each of the discharge pipes 34, 36 and 38 for selectively controlling the flow of fluid from the cooling towers 12, 14 and 16 for reasons to be made clear hereinbelow.

Referring now to FIG. 2, the structure of the cooling towers will be discussed in detail. Cooling tower 14 comprises a plurality of support legs 54 secured to the concrete foundation 18 by means of anchor bolts 56. In the preferred embodiment of the present invention four support legs 54 are employed, see FIG. 1, and may be made of steel or any other suitable material which is capable of supporting the cooling tower 14. Secured to the support legs 54 by means of bolts 58 is pipe 60 which forms the outer wall of the cooling tower 14. It is preferred, for reasons to be explained hereinbelow, that pipe 60 be an aluminum corrugated helical pipe, for example, the helical pipe sold by Kaiser Aluminum under the trademark CORLIX ®. A four sided aluminum hood 62 is secured to pipe 60 by means of brackets 64 and bolts 66. The hood 62 is provided with openings 68 on each of its sides so as to allow air to pass from the interior of the cooling tower 14 defined by pipe 60 to the exterior thereof. A compression ring 70 provided with a plurality of eyelets 72 is secured to the top of pipe 60 proximate to hood 62. Steel cable 74 extends from the eyelets 72 to anchor bolts 76 provided in concrete foundation 18 for further supporting pipe 60 of cooling tower 12. In the preferred embodiment four support cables are provided for each cooling tower and each support cable 74 is provided with a turnbuckle 78 for adjusting the tension of the cables 74. In the alternative steel rods or the like may be substituted for the cableturnbuckle arrangement.

Secured within pipe 60 of cooling tower 14 by means of brackets, not shown, is a U-shaped aluminum transport pipe 80 for transporting a stream of compressed air through the cooling tower 14. As can best be seen in FIG. 3, pipe 80 may be provided with cooling fins 82 to assist in transferring heat between the exterior of pipe 80 and the interior 84 of cooling tower 14 as defined by pipe 60. The ends 86 and 86' of the transport pipe 80 are bent at an angle and project through openings 88 in pipe 60 and rest on support legs 54. Ends 86 and 86' of transport pipe 80 are connected to intake pipe 28 and discharge pipe 36, respectively, by means of couplings 90. Each of the discharge pipes 34, 36 and 38 are provided with throttles 92, as shown in FIG. 2, for restricting the flow of the stream of compressed air downstream of the cooling towers 12, 14 and 16. Upstream of the throttles 92 provided on end 86' of transport pipe 80 is a heating element 94 for heating that portion of the transport pipe 80 immediately upstream of throttle 92. Temperature sensing means 112 and 112' are provided on ends 86 and 86', respectively, for sensing the temperature of the stream of compressed air as it passes through pipe 80. Drain pipes 96, 98 and 100 are provided in the bottom of end 86 and 86' and intake distributor tank 24 for draining waste water and oil from the stream of compressed air into line 102 to discharge tank 104. Tank 104 is provided downstream thereof with an automatically actuated drain valve 106 which is actuated in response to the level of water and oil in tank 104. The level of water and oil in tank 104 may be sensed by any suitable means such as floats, electrodes or the like. A manual back up valve 108 is provided downstream of valve 106.

Provided at the bottom of corrugated pipe 60 and secured thereto by suitable means is a standard ring fan 110 for circulating ambient air up through the interior 84 of cooling tower 14 over the fins 82 of transport pipe 80 and out openings 68 provided in hood 62.

With reference to FIGS. 1 through 3, the operation of the installation of the present invention will be discussed in detail.

Compressed air is supplied to pipeline 20 from a compressor station, not shown, located downstream of cooling installation 10. During the operation of the compressors a certain amount of lubricating oil blows by the pistons of the operating compressors making its way into pipeline 20. In addition, heat generated by the compressors during the operation thereof results in a condensate forming in the pipeline 20 due to condensation. The condensate and oil particles are carried along with the stream of compressed air to intake distributor tank 24 of cooling installation 10. Intake distributor tank 24 distributes the stream of compressed air containing the condensate and oil particles to any one or more of the cooling towers provided in cooling installation 10 via intake pipes 26, 28 and 30. By selectively adjusting valves 42, 44 and 46 provided in intake pipes 26, 28 and 30, respectively, the stream of compressed air is directed to any one or more of the cooling towers 12, 14 and 16. With reference to FIG. 2, the operation of the cooling towers will be explained in detail. The stream of compressed air containing the condensate and oil particles is fed from intake pipe 28 to transport pipe 80 for carrying the stream of compressed air through the cooling tower 14. Fan 110 circulates ambient air through the interior 84 of cooling tower 14 in heat exchange relationship with pipe 80 and cooling fins 82. In practice, the ambient temperature is generally below 25° F. and must be below the freezing temperature of water in order for the cooling tower to function properly. By providing a helical corrugated pipe 60 as the housing for the cooling tower 14, the ambient air circulates in a spiralling fashion up through the cooling tower 14 thereby providing an extremely efficient heat exchange relationship with the pipe 80 and cooling fins 82. As the stream of compressed air circulates through transport pipe 80 the condensate which is being cooled by the circulation of cold air through the cooling tower crystallizes and the oil particles in the air stream adhere to the crystallized vapor. As the crystallized condensate approaches the outlet end 86' of transport pipe 80, the stream of air is slowed as a result of the throttle 92 and discharge pipe 36. Adjustment of valve 50 in discharge pipe 36 may further slow the passage of the stream of compressed air. By throttling the flow of compressed air as described above the outlet end 86' of the pipe forms in effect a holding zone for the crystallized condensate. This zone 86' is provided with heating elements 94 for heating the holding zone so as to melt the crystallized condensate which, along with the oil particles, separates out from the stream of air under the force of gravity and is drained from the compressed air stream and is via lines 98 and 102, feed under pressure to a discharge tank 104 located, preferably, at the compressor station. Thus, the water and oil particles carried by the compressed air stream are effectively removed and the compressed air stream free of water and oil particles is carried via pipeline 32 to the snow-making equipment at the various ski trails. Further drain pipes 96 and 100 are located upstream of the cooling towers to drain any oil or liquid which may form at those points. The waste water and oil collected in tank 104 is, as noted above, under pressure due to the compressed air stream. Suitable sensing means is provided in tank 104 to sense the accumulation of waste water and oil therein and to actuate drain valve 106 to open same so as to allow for periodic draining of tank 104. A manual back up valve 108 may be provided downstream of the automatic drain valve 106.

As can be seen from the foregoing, in accordance with the present invention, effective removal of water and oil from a stream of compressed air is accomplished in a simple and economical manner. By way of the present invention the problems heretofore encountered, namely, freeze up of the snow-making equipment and contamination of the environment is overcome.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In an installation for making snow wherein a stream of compressed air and a stream of pressurized water are fed from a compressor station and a pumping station via separate lines to the nozzles of snow-making equipment where said compressed air and pressurized water are mixed to produce a stream of snow particles, an apparatus for removing condensate and oil particles from said stream of compressed air comprising:

conduit means for feeding a stream of compressed air from said compressor station to said snow-making equipment;

cooling means associated with said conduit and positioned upstream of said snow-making equipment for cooling the stream of compressed air so as to crystallize the condensate and allow the oil particles to adhere thereto;

means downstream of said cooling means for holding the crystallized condensate and oil particles in a holding zone;

heating means associated with said holding zone for heating said holding zone so as to liquefy the condensate; and means for separating said liquefied condensate and oil particles from said compressed air stream in said holding zone.

2. An apparatus according to claim 1 wherein said means downstream of said cooling means for holding the crystallized condensate and oil particles in a holding zone comprises a throttle.

3. An apparatus according to claim 1 wherein said cooling means comprises at least one cooling tower having a pipe enclosing a portion of said conduit means and further includes means for circulating air through said pipe over said conduit means.

4. An apparatus according to claim 3 wherein said pipe is a corrugated helical pipe.

5. An apparatus according to claim 4 wherein said pipe is made of aluminum.

6. An apparatus according to claim 3 wherein said means for circulating said air comprises a fan.

7. An apparatus according to claim 3 wherein the portion of the conduit means enclosed by said pipe is provided with cooling fins.

8. An apparatus according to claim 1 wherein valve means are provided downstream and upstream of said cooling means for controlling the flow of the stream of compressed air through said cooling means.

9. An apparatus according to claim 1 wherein drain means communicates with said holding zone for draining said liquefied condensate and oil to a holding tank.

10. An apparatus according to claim 9 wherein said holding tank includes means for sensing the level of water and oil in said tank.

11. An apparatus according to claim 10 wherein valve means is provided downstream of said holding tank for draining said water and oil therefrom upon the sensing by said sensing means of a predetermined height of water and oil in said tank.

12. An apparatus according to claim 3 wherein a plurality of cooling towers are arranged in parallel.

* * * * *